United States Patent [19]

Glicksman

[11] Patent Number: 5,460,200
[45] Date of Patent: Oct. 24, 1995

[54] FLUID FLOW CHECK VALVE AND METHOD FOR MAKING SAME

[75] Inventor: Milton Glicksman, Teaneck, N.J.

[73] Assignee: Multi-Flex Seals, Inc., Hackensack, N.J.

[21] Appl. No.: 338,256

[22] Filed: Nov. 14, 1994

[51] Int. Cl.⁶ .................................................. F16K 15/16
[52] U.S. Cl. ....................... 137/512.4; 137/843; 156/290; 446/224
[58] Field of Search .................................... 137/843, 844, 137/512.4; 156/290; 383/44; 446/224

[56] References Cited

U.S. PATENT DOCUMENTS

| | | | |
|---|---|---|---|
| 4,708,167 | 11/1987 | Koyamagi | 137/512.15 |
| 4,917,646 | 4/1990 | Kieves | 446/224 |
| 4,983,138 | 1/1991 | McGrath | 446/224 |
| 5,144,986 | 9/1992 | Drew | 137/843 |
| 5,248,275 | 9/1993 | McGrath | 137/844 X |
| 5,295,892 | 3/1994 | Felton | 446/224 |
| 5,308,163 | 5/1994 | Abe | 137/846 X |

*Primary Examiner*—Robert G. Nilson
*Attorney, Agent, or Firm*—Martin Parkinson

[57] ABSTRACT

A reliable and economical one way fluid flow check valve fabricated from two thin sheets of plastic is described. One or more half cylindrically shaped depressions are vacuum formed across one or both sheets of plastic, and a ½ funnel shape fluid entrance can be simultaneously vacuum formed in one or both sheets. The two sheets are than heat sealed together at their longitudinal edges to form the complete check valve. The check valve is preferably in the form of a truncated V. The check valve can be heat sealed into a variety of devices such as toy balloons, cushions, mattresses, inflatable boats, and the like. Various modifications are described for light or heavier fluid pressure applications.

13 Claims, 4 Drawing Sheets

5,460,200

FLUID FLOW CHECK VALVE AND METHOD FOR MAKING SAME

BACKGROUND

This invention relates to fluid flow check valves, and in particular to one way fluid flow valves for inflating devices such as air cushions or balloons.

A number of check valves have been proposed for admitting air, water, or other fluids into a suitable fluid retaining chamber such as a cushion or balloon, while at the same time having the check valve prevent the escape of the admitted fluid during and after the fluid filling process. For example, U.S. Pat. No. 4,708,167 teaches a check valve for incorporation into devices such as a balloon toy. This check valve is formed from three plastic sheets (e.g. polyethylene), two sheets being heat sealed at their lateral edges to form the body of the valve, with the third sheet being heat sealed between the two body sheets to form the valving mechanism of the invention. A fluid channel between the third valve sheet and the two body sheets opens during fluid flow entering the balloon, and then closes due to air pressure within the balloon when entering fluid flow ceases.

U.S. Pat. No. 4,917,646 discloses two plastic sheets being bonded together to form a self sealing check valve for use primarily in non-latex balloons. The invention teaches utilizing non-coterminous plastic sheets having a barrier coating between said sheets at the inlet end of the valve, and also a positioning tab at the valve inlet to facilitate fabrication of the balloon-valve combination. Three additional prior art valves are discussed in FIGS. 6–8A similarly employing two or more plastic sheets comprising a one way fluid flow check valve.

Again in U.S. Pat. No. 4,983,138 a self sealing valve primarily for use with metallized toy balloons is disclosed. In this invention a plastic sheet is heat sealed within a balloon forming a two way valve which prevents fluid entry or release from the balloon when the balloon is fully inflated.

Additional self sealing check valves are described in U.S. Pat. Nos. 5,295,892, 5,144,986, and 5,308,163. A two plastic sheet check valve having additional structure for facilitating insertion of a gas supply nozzle for inflation of the balloon is disclosed in U.S. Pat. No. 5,295,892. In U.S. Pat. No. 5,144,986 a flexible plastic sheet having an aperture heat sealed between two flat plastic sheets to act as a flexible on/off flow diaphragm during fluid filling is disclosed. And U.S. Pat. No. 5,308,163 teaches a check valve comprising valve flaps defined and formed by a pair of heat sealed portions each composed of a plurality of curved heat seals coupled to each other in such a way as to approximately form a T-shaped valve flap at the junction thereof which serves as a fluid retaining segment.

While these check valve devices provide a variety of unique approaches to practical one way fluid flow valves, they do not address the simplification in fabrication, and innate reliability envisioned in the instant invention.

It is therefore a primary object of the present invention to provide an easily fabricated and economical fluid flow check valve.

Another object of the present invention is to provide greater reliability in fluid retention in an economically fabricated fluid flow check valve.

An additional object of the invention is to provide a fluid flow check valve that is capable of convenient connection to a source of fluid flow.

Still another object of the invention is to provide an economical method for fabricating a fluid flow check valve that can be conveniently altered to the degree of fluid pressure entry required by various check valve applications.

SUMMARY

These and other objects are accomplished in the instant invention of a one way, fluid flow check valve.

As has been noted, a variety of practical and economical check valves for use in conjunction with toy balloons, air cushions, and the like have been proposed. In a simple form, a one way fluid flow check valve can be fabricated out of two flat sheets of a suitable plastic material. Once the plastic sheets are sealed at their lateral edges and installed in an inflatable device, they can perform the basic function of a one way check valve. In the case, for example, of a toy balloon, blowing air into this simple valve inlet allows the balloon to inflate, and when air introduction ceases the air pressure now within the balloon causes the two sheets of the check valve to be pressed together, effectively preventing the escape of air from the balloon via the air passageway in the check valve. While valves of this type are satisfactory for some applications, they tend to lose fluid from the inflated device due to a variety of fluid channel causing defects within the films. Also applications involving higher fluid pressures or larger valve sizes tend to magnify fluid leak problems associated with this construction.

I find that an extremely reliable and inexpensive one way fluid flow check valve can be fabricated in a simple manner utilizing two thin, flexible plastic sheets to form the complete valve. In a preferred construction of the instant invention, a permanent depression is impressed in at least one of two sheets of a suitable plastic, such as polyurethane, said depression extending laterally across the sheet of plastic between its left and right edges. Then the two sheets of plastic are heat sealed together at their longitudinal edges so as to define a fluid inlet and fluid outlet. This forms a complete check valve which can now be heat sealed to a fluid container, with the portion of the valve containing the depression and the fluid outlet being heat sealed within the fluid container, and the top portion of the valve containing the fluid inlet being external to the fluid container. Heat sealing the check valve to the fluid container is, of course, accomplished in a manner that heat seals the front of one of the sheets of the valve to a first inner surface of the fluid container, and the back of the other sheet of the valve to a second inner surface of the fluid container, and does so in a manner that retains the fluid channel in the check valve between the fluid inlet portion and the fluid outlet portion.

In operation, as fluid pressure develops within the fluid container, when the pressure within the container exceeds the entrance fluid pressure the two sheets of polyurethane are caused to be pressed together, with the area containing the depression acting as a secure clamp laterally across the fluid passageway within the valve. The depression acts to evenly distribute the maximum pressure acting at the base of the depression across the entire length of the depression. This simple construction greatly improves the fluid retention characteristics of the valve without significantly interfering with the ease of filling the fluid container, even, for example, in the case of blowing up a toy balloon by mouth. The depression within the polyurethane sheet can have many shapes, such as a V shape or a rectangular trough. However, a curved shape from one edge of the depression to the directly opposite edge throughout the length of the depression is preferred, the most efficient shape being in the form of a half cylinder.

The fluid retention properties of the valve is further improved by having the valve in the shape of a truncated V, with the fluid inlet portion being substantially wider than the fluid outlet portion. Fluid retention can be increased still further by having a plurality of depressions formed at spaced intervals along the length of the valve. To facilitate fluid filling the fluid inlet portion can be formed into the shape of a ½ funnel or full funnel for convenient attachment to water faucets, etc. For higher pressure fluid filling operations both polyurethane sheets forming the valve can have identical depressions, with the inner surface of the base of each depression in the first sheet facing a matching inner surface at the base of an identical depression in the second sheet comprising the check valve, so that the bases of the depressions are immediately adjacent each other throughout their length. In this manner extremely reliable fluid retention for higher pressure applications, as, for example, when utilizing an air compressor to fill a fluid chamber are employed, is achieved at virtually no additional fabrication cost for the check valve.

Heat sealing is the preferred method for sealing the edges of the check valve together, and to secure the check valve to a fluid container. Of course, a variety of other methods can be employed, such as utilizing appropriate adhesives. While vacuum forming is the preferred method for forming the depressions and funnel shape into the polyurethane check valve, a variety of other methods including heated die forming and casting can be similarly employed. Polyurethane plastic sheet has been described as the preferred material of fabrication. Obviously a variety of other flexible plastics and natural and synthetic rubbers can be the materials of fabrication.

DETAILED DESCRIPTION

Figure 1:
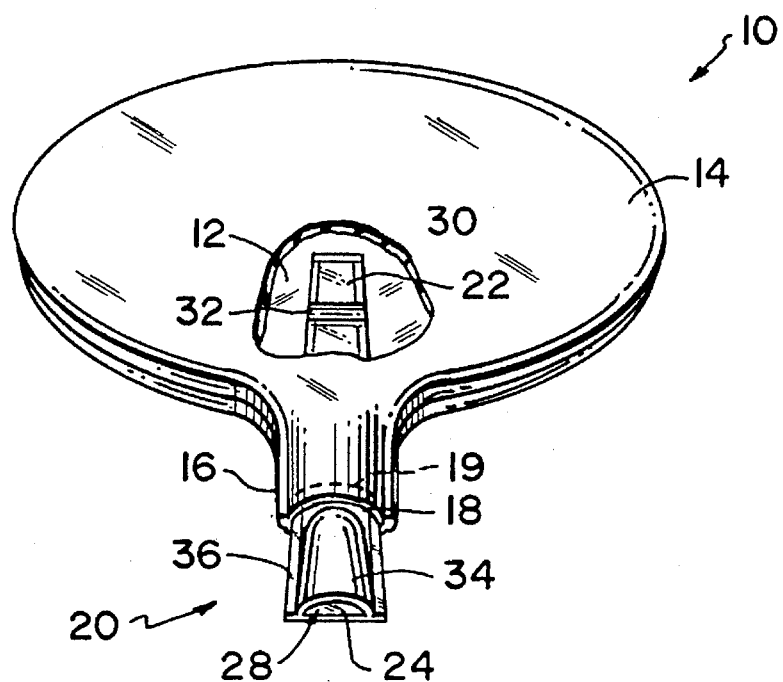
FIG. 1 is a perspective view of one version of the check valve of the invention in combination with a balloon, with the balloon partially broken away to show a portion of the check valve within the balloon.

In FIGS. 1–6 similar structures having similar functions are denoted with the same numerals. Referring now to the drawings, in FIG. 1 a toy balloon and a version of the one way fluid flow check valve 20 of the invention are shown heat sealed together 10. As depicted in FIG. 1A one version of toy balloon could be made out of two sheets 12, 14 of an elastomeric material, as, for example, thin sheets of polyurethane. The two sheets can be identical, with a tab portion 13, 15 at one end of each sheet. Heat sealing the two sheets (12, 14) together at their longitudinal edges, except for a portion at the tip (17, 21) of each tab portion, would then form a balloon type of structure capable of being filled with air or other fluids via the opening (not shown) in the neck portion 16 (FIG. 1) of the complete balloon structure. A check valve such as the check valve 20 illustrated in FIG. 3 can be incorporated into the structure of the balloon during the process of heat sealing the sides 12, 14 of the balloon together, or after the balloon is formed, by simply inserting the check valve into the opening (not shown) in the inlet opening to the balloon formed by the unsealed edges 17, 21 at the tip portion of the tabs 13, 15 on each of the balloon sides. The toy balloon structure described is conventional and well known to the art.

Figure 2:
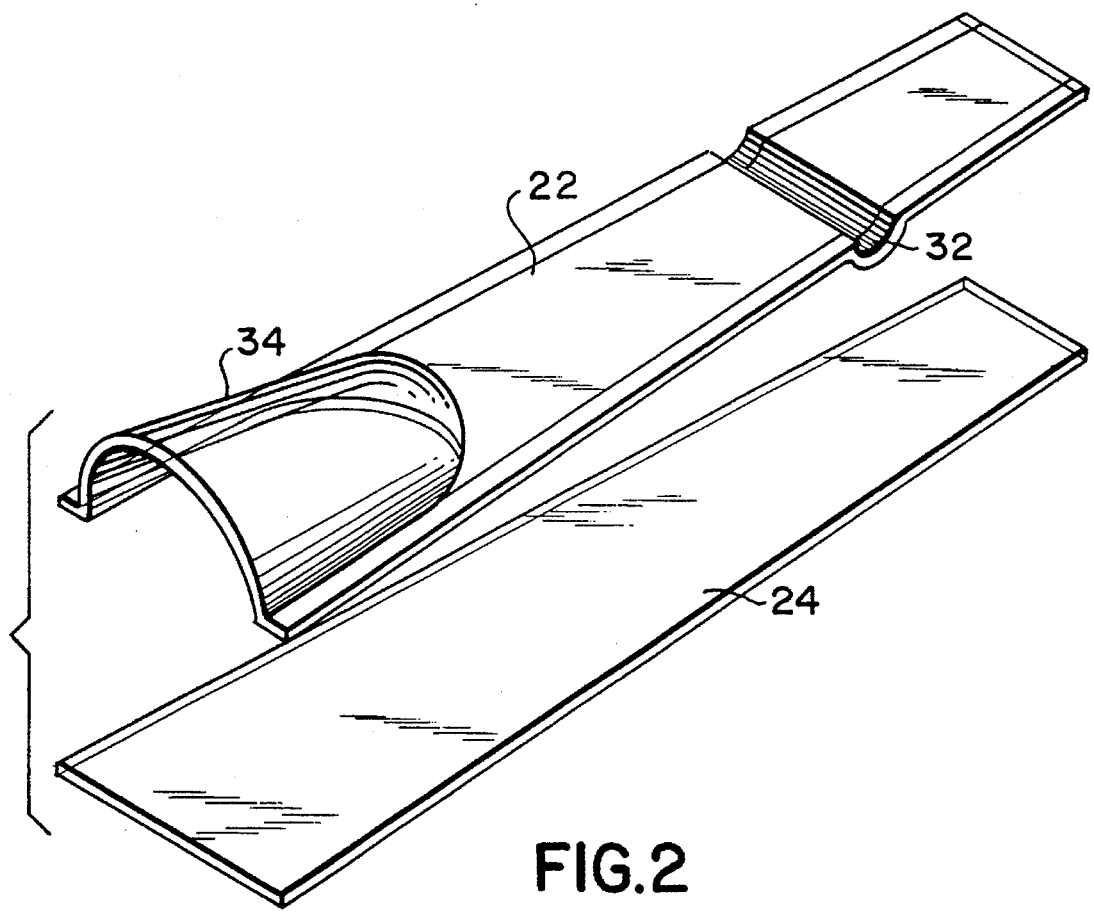
FIG. 2 is an exploded perspective view of the check valve of FIG. 3.
Figure 3:
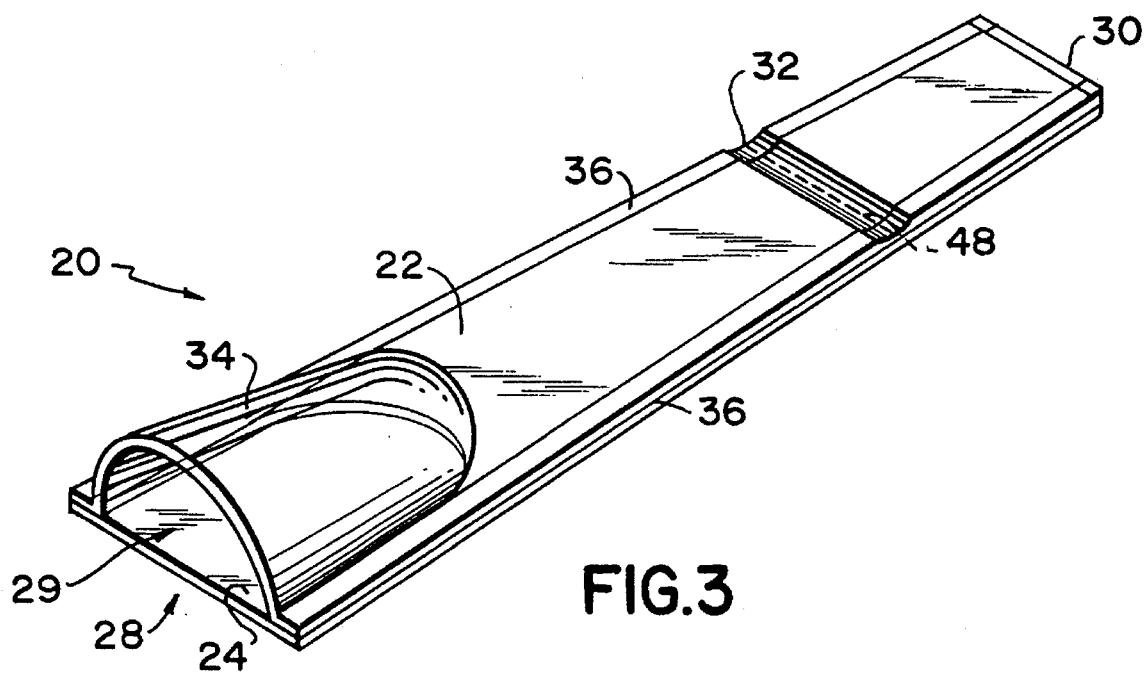
FIG. 3 illustrates the components of FIG. 2 forming one version of a complete check valve of the invention.

FIGS. 2 and 3 illustrate a version of the one way fluid check valve of the invention. Two flat sheets 22, 24 of polyurethane form the structure of the valve. The sheets can be, for example, 0.015" in thickness. They are both cut into matching sides with a typical length being 5½". Both sheets are cut in the form of a truncated V, having a typical top width of 1¼", and a width at the base of ¾". One side 24 of the two sheet valve remains flat, while the second side 22 has two structures vacuum formed within it. The first structure is in the form of a ½ portion of a funnel 34, beginning at the top or widest portion of the second side 22, and extending virtually across this width, with the apex of the funnel cone ending about 1½" from the top of this sheet approximately at the middle portion of this sheet. The function of this 1½" funnel shape is to facilitate blowing up a balloon or other fluid retaining device by mouth, or by connecting this fluid entrance to a water faucet, etc. At a point approximately 4" from the top of the sheet 22 a depression 32 is vacuum formed laterally across the sheet between and connecting the edges 36 of the sheet. This depression can be vacuum formed in a variety of shapes, as, for example, a rectangular or a V shape. The preferred shape is one of a curve from one top edge of the depression to the other top edge of the depression directly across, as viewed across the width of the depression. Ideally, the curved shape is substantially that of a half cylinder, i.e. a cylinder which is cut in half throughout its length. A typical dimension of the depression would be approximately 1" in length, ¼" in width, and ⅛" in depth. The two sheets 24, 22 are then placed one on top of another to form a complete truncated V shape, with the ½" funnel shape in the vacuum formed sheet 22 facing away from the flat sheet 24, and with the apex of the depression 32 in the vacuum formed sheet facing the flat sheet 24. The two sheets are then heat sealed together at their longitudinal edges 36 to form the complete check valve 20. The unsealed top portion of the valve now contains the fluid entrance 28 to the fluid passageway 29, and at the unsealed bottom end of the valve the fluid exit 30 is formed, confluent with the fluid passageway 29.

Figure 1A:
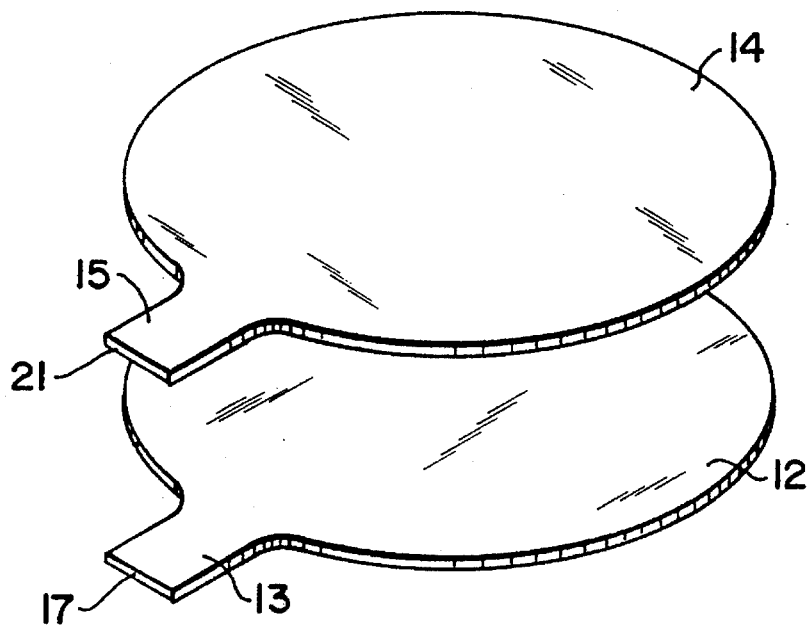
FIG. 1A is an exploded view of two sides of a possible balloon structure before being joined by heat sealing.

As can be seen in FIG. 1, the complete check valve 20 can be inserted into the opening (not shown) in the neck 16 of the balloon structure, with a first inner surface 18 of the neck of the balloon being heat sealed to the front surface of the vacuum formed side 22 of the valve 20, and a second inner surface 19 of the neck of the balloon being heat sealed to the rear surface of the flat sheet 24 of the valve, the heat sealing occurring across the edges 36 at a line approximately midway between the apex of the cone on the ½ funnel 34 and the beginning of the half cylindrical depression 32. This heat sealing step is performed in a manner so as to leave the passageway 29 within the valve open between the valve fluid entrance 28 and fluid exit 30.

The check valve and balloon combination 10 function together in the following manner. An individual can simply inflate the ballon with air by mouth. As air is introduced into the balloon, increasing air pressure surrounds that portion of the check valve that is within the balloon, containing the half cylindrically shaped depression 32. When air flow into the balloon ceases this increased air pressure now caused the two plastic sheets 22, 24 comprising the valve to be pressed together, trapping the higher air pressure within the balloon. The escape of air through the fluid exit 30 and air passageway 29 is further impeded by the clamping action of the depression 32. That portion of the flat sheet 24 of the check valve which is now firmly in contact with the depression assumes the shape of the depression, with maximum air pressure being exerted along the dotted line 48 in FIG. 3, between the rear surface of vacuum formed sheet 22 at the base of the depression, and the front surface of the flat sheet 24 now in contact with the depression. The depression 34 can have a variety of shapes including rectangular or V shaped, with a curved and preferably half cylindrical shape throughout the length of the depression. The action of the contact point denoted by the dotted line 48 in FIG. 3 is similar in principal to the action of the well known "O" ring in fluid retention. Pressure exerted on an "O" ring causes the "O" ring to form a maximum securing line across the length of the "O" ring at the base of the "O" ring, i.e. at 90 degrees either left or right of a hemispherical section taken through the "O" ring. As in the case of the "O" ring, additional pressure will cause this line across the length of the depression to grow wider, further improving resistance to the escape of air within the balloon. In this manner the clamping action of the depression equalizes pressure across the length of the depression, either eliminating or greatly reducing leak potentials across fluid channels that may be present in the fluid passageway.

Figure 4:
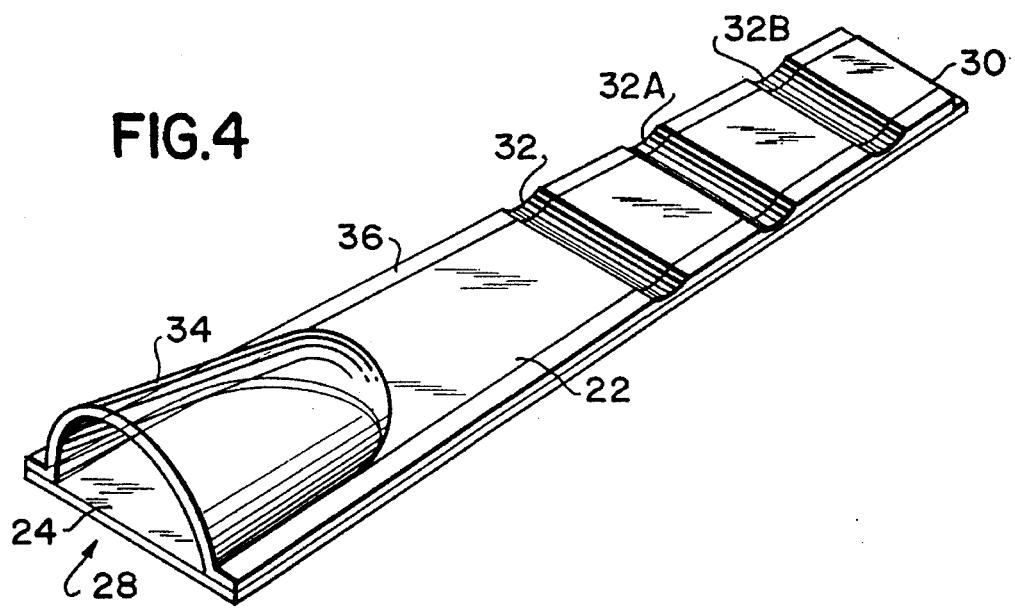
FIG. 4 shows a check valve similar to the check valve of FIG. 3, having two additional vacuum formed depressions.

As illustrated in FIG. 4, the check valve of the invention can provide still greater security against fluid leakage after fluid inflation of a container by simply adding additional depressions (32A, 32B) at spaced distances along the length of the valve. For example, vacuum forming three half cylindrically shaped depressions 32, 32A, 32B across the width of the formed sheet 22 of the valve substantially reduces fluid leak paths through the fluid passageway 29 in the check valve, and does so at virtually no additional fabrication cost.

Figure 5A:
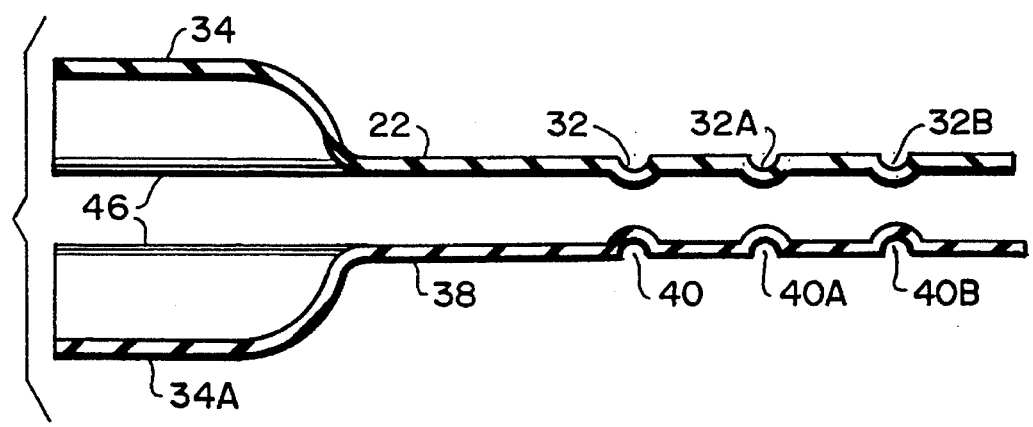
FIG. 5A illustrates two plastic sheets before heat sealing, having mirror image depressions, which can be formed into the check valve of FIG. 6.
Figure 5B:
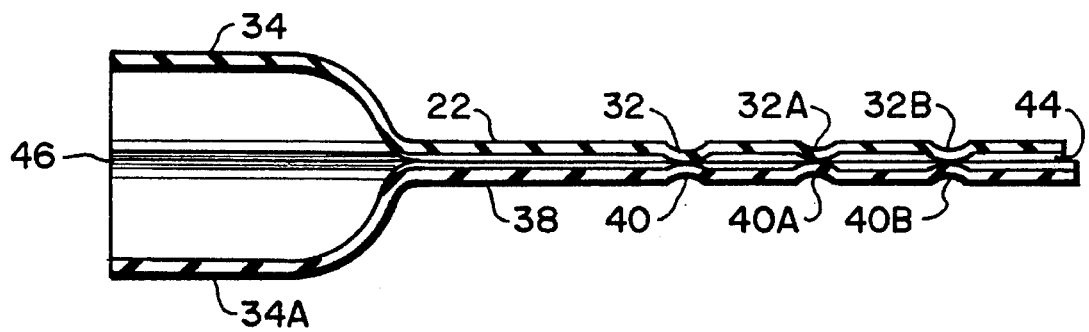
FIG. 5B is a side, sectional view of one possible check valve of the invention, taken along line 5B—5B of FIG. 6.
Figure 6:
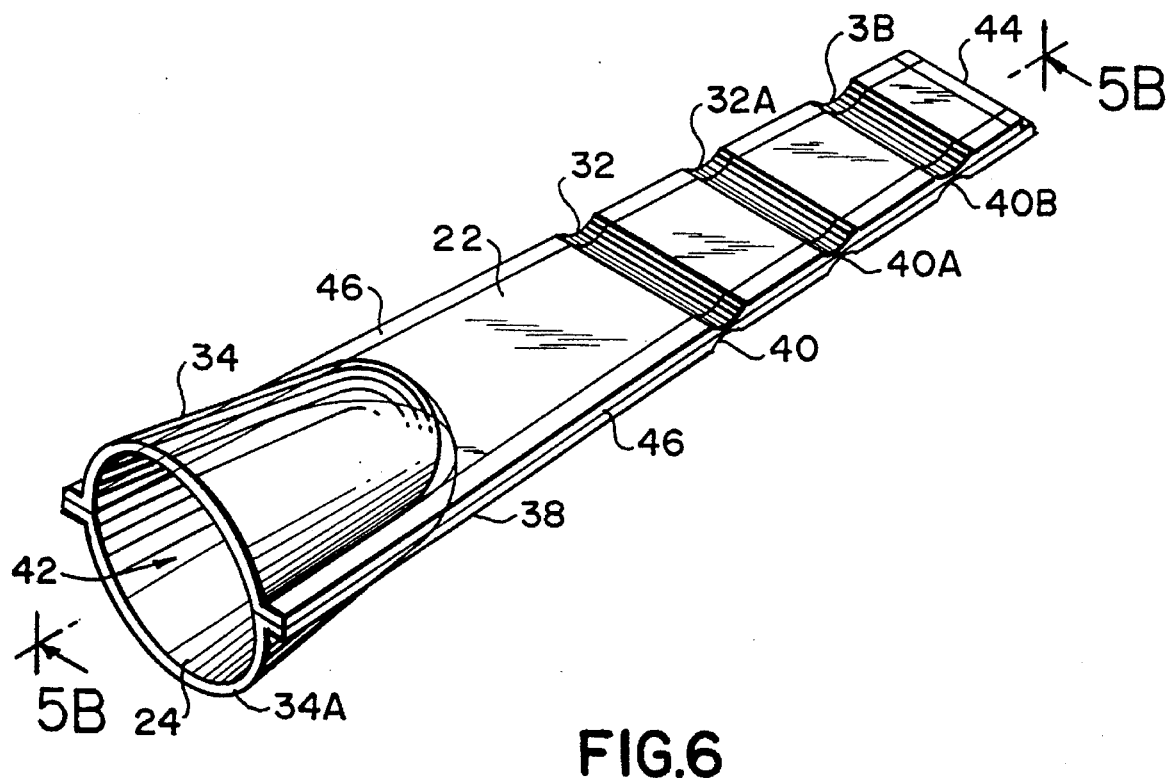
FIG. 6 illustrates an additional possible check valve version of the invention with both plastic sheets comprising the check valve having mirror image matching depressions in the form of half cylinders, and a full funnel shaped fluid entrance.

In another version of the check valve illustrated in FIGS. 5A, 5B, and 6, both plastic sheets comprising the check valve have matching vacuum formed depressions. This modification serves to give maximum leak seal protection in higher pressure applications, such as air compressor filling of mattresses, inflatable boats, and the like. As shown in FIG. 5A, a high pressure one way fluid check valve is easily achieved by simply having two virtually identical plastic sheets with identical half cylindrically shaped depressions formed in each sheet. A first sheet is identical to the vacuum formed sheet 22 shown in FIG. 4, with a second sheet 38 differing only in that the ½ funnel shape 34A is configured concave to the ½ funnel shape of the first sheet so as to form a complete funnel shape when joined together. The second sheet has half cylindrically shaped depressions 40, 40A, 40B identical to the depressions 32, 32A, 32B in the first sheet except that the apex of the depressions in the second sheet are configured convex to the apex of the depressions within the first sheet. When the two sheets 34, 22 are heat sealed together at their longitudinal edges 46 a complete, high pressure, one way fluid flow check valve is formed. This valve is ideal for those applications wherein fluid filling devices such as air compressors provide a convenient means for filling a fluid container via the fluid opening 42, the fluid passageway 29, and the fluid exit 44 of the valve, and where extremely low leak rates from the container subjected to higher pressures is essential. Pressure within the fluid container now acting on the dual depressions form an extremely reliable fluid seal. At the same time adding an additional ½ funnel shape at the fluid entrance to the check valve adds convenience in attaching the valve entrance to a source of air or other fluid. The check valve of the invention can therefore be easily modified for simple air filling by mouth applications to fluid container operations demanding high pressure filling and fluid retention properties.

In addition to the enhancements described above, the check valve can be modified for less demanding fluid filling procedures by: reducing the thickness of the plastic sheets; using softer grades of material; changing the truncated V shape of the valve to rectangular shape so that there is less clamping force between the two plastic sheets comprising the valve; reducing the number and size of the vacuum formed depressions.

Thus it can be seen that a highly reliable and economical one way fluid check valve can be fabricated to encompass a wide variety of fluid filling procedures utilizing two thin sheets of a flexible plastic material. Simply vacuum forming the disclosed structure into the sheets and sealing them together provides economy of fabrication with enhanced functioning of the check valve.

While the present invention has been disclosed in connection with preferred versions shown and described in detail, various modifications and improvements thereon will become readily apparent to those skilled in the art. Accordingly, the spirit and scope of the present invention is to be limited only by the following claims.

What is claimed is:

1. A fluid flow check valve, comprising:

(a) two sheets of plastic material;

(b) said sheets being substantially coterminous with each other;

(c) said sheets having a top portion and a base portion, and a left side and a right side;

(d) said sheets being sealed together at said left side and said right side along the longitudinal length of said sides, defining a fluid passageway therebetween;

(e) said top portion and said base portion of said sealed sheets having an opening to a flow of said fluid within said passageway;

(f) a first one of said two sheets being flat throughout its width and said length, and a second one of said two sheets having at least one depression extending laterally between and joining said sealed left side of said sheets and said sealed right side of said sheets; and (g) said depression having the base portion of said depression facing said first sheet so that when said fluid flow check valve is incorporated into a fluid retaining chamber, and when fluid is introduced into said chamber via said valve, pressure developed by said fluid within said chamber causes a secure closure of said passageway between said first and second sheets at a junction of said base portion of said depression and said first sheet of said plastic material when said pressure causes said first and said second sheets of plastic material to be pressed together.

2. A fluid flow check valve as recited in claim 1 wherein said depression is curved in shape between a first top edge of said depression and a directly opposite second top edge of said depression throughout the length of said depression.

3. A fluid flow check valve as recited in claim 2 wherein said curved shape of said depression defines the shape of a half cylinder throughout said length of said depression.

4. A fluid flow check valve as recited in claim 1 wherein said first and second sheets are sheets of polyurethane plastic material.

5. A fluid flow check valve as recited in claim 1 wherein the width of said top portion between said left and right sealed sides immediately adjacent said opening to said fluid flow is greater in width than the width of said base portion between said left and right sealed sides immediately adjacent said opening to said fluid flow.

6. A fluid flow check valve as recited in claim 1 wherein a portion of said top portion immediately adjacent said opening to said fluid flow in at least one of said sheets of plastic material is formed in the shape of a ½ funnel.

7. A fluid flow check valve as recited in claim 1 wherein said depression is vacuum formed into said second sheet.

8. A fluid flow check valve as recited in claim 1 wherein said sides are sealed together by means for heat sealing plastic films together.

9. A fluid flow check valve as recited in claim 1 wherein said first sheet and said second sheet have one or more matching depressions formed within them, so that when said sheets are sealed together the base of said depression throughout the length of said depression in said first sheet is immediately adjacent the base of said depression throughout the length of said depression in said second sheet.

10. A method for manufacturing a one way fluid flow check valve, comprising the steps of:

(a) selecting two sheets of plastic having similar widths and lengths:

(b) forming a permanent depression laterally across the width of a first sheet of said two sheets of plastic;

(c) placing said first sheet and said second sheet together so that the sheets are substantially coterminous with each other, with the base of said depression in said first sheet facing said second sheet; and (d) sealing said first and second sheets together along their longitudinal edges comprising the length of said sheets so as to form a fluid passageway between said first and said second sheets.

11. The method according to claim 10 further comprising the step of forming an enlarged area in the shape of a ½ funnel at one end of at least one of said sheets of plastic in order to facilitate connection of said check valve to a source of fluid.

12. The method according to claim 10 further comprising the step of forming a similar matching permanent depression to said depression in said first plastic sheet in said second plastic sheet so that when said two sheets are placed together the base of said depressions are immediately facing each other throughout the length of said depressions.

13. The method according to claim 10 wherein said first and second sheets have the shape of a truncated V, being sealed together from their widest portion to their narrowest portion, with a fluid inlet to said fluid passageway being located at the end of the widest portion of said check valve, and a fluid outlet from said fluid passageway being located at the end of the narrowest portion of said check valve.

* * * * *